United States Patent
DeLuca et al.

[11] Patent Number: 5,949,827
[45] Date of Patent: Sep. 7, 1999

[54] CONTINUOUS INTEGRATION DIGITAL DEMODULATOR FOR USE IN A COMMUNICATION DEVICE

[75] Inventors: Michael J. DeLuca, Austin, Tex.; Emilio J. Quiroga, Lake Worth, Fla.

[73] Assignee: Motorola, Inc., Schaumburg, Ill.

[21] Appl. No.: 08/934,404

[22] Filed: Sep. 19, 1997

[51] Int. Cl.$^6$ .................................................. H04L 27/14
[52] U.S. Cl. ........................... 375/324; 375/340; 455/255
[58] Field of Search ..................................... 375/316, 322, 375/324, 340; 329/315, 321, 323; 455/205, 208, 210, 255, 67.3, 63, 501; 365/724.1

[56] References Cited

U.S. PATENT DOCUMENTS

| | | | |
|---|---|---|---|
| 4,631,737 | 12/1986 | Davis et al. | 375/88 |
| 4,816,820 | 3/1989 | Davis | 340/825 |
| 5,058,204 | 10/1991 | Tahernia et al. | 455/183 |
| 5,109,544 | 4/1992 | Mittel et al. | 455/182.2 |
| 5,222,255 | 6/1993 | Kuo et al. | 455/226 |
| 5,274,579 | 12/1993 | Nelson et al. | 364/724.09 |
| 5,303,416 | 4/1994 | Morera | 455/296 |
| 5,311,554 | 5/1994 | Morera et al. | 375/75 |
| 5,376,894 | 12/1994 | Petranovich | 329/306 |
| 5,425,056 | 6/1995 | Maroun et al. | 375/316 |
| 5,555,452 | 9/1996 | Callaway et al. | 455/226.6 |
| 5,563,537 | 10/1996 | Seta | 327/113 |
| 5,627,860 | 5/1997 | McKinney et al. | 375/317 |
| 5,802,462 | 9/1998 | Lautzenhiser | 455/208 |

*Primary Examiner*—Chi H. Pham
*Assistant Examiner*—Emmanuel Bayard
*Attorney, Agent, or Firm*—James A. Lamb

[57] ABSTRACT

A digital demodulator (100) for use in a communication device comprising a mixer (110) which samples a limited IF signal derived from a received radio frequency (RF) signal at a rate less than a Nyquist rate of the limited IF signal and generates a resulting IF signal. A continuous integrator (130) is connected to the mixer (110) and integrates the resulting IF signal over a predetermined number of samples thereof to generate a numerical value representative of a modulation frequency of a limited IF signal. An adaptive peak-valley bit slicer (150) is connected to the continuous integrator (130) and compares each numerical value with a peak threshold, a valley threshold and a mid threshold and generates most-significant-bit (MSB) and least-significant-bit (LSB) values for each sample. The adaptive peak-valley bit slicer (150) adjusts the peak and valley thresholds for use in determining a level of a current numerical value based on the LSB and MSB values determined for a prior sample of the numerical value.

29 Claims, 5 Drawing Sheets

ADAPTIVE BIT SLICING PEAK & VALLEY THRESHOLDS

| LAST SAM | NEXT SAMPLE | | |
|---|---|---|---|
| | TH HI | TH MID | TH LO |
| 10 | (5P+V)/6 | (P+V)/2 | (P+3V)/4 |
| 11 | (5P+V)/6 | (P+V)/2 | (P+5V)/6 |
| 01 | (5P+V)/6 | (P+V)/2 | (P+5V)/6 |
| 00 | (3P+V)/4 | (P+V)/2 | (P+5V)/6 |

CONTINUOUS INTEGRATION DIGITAL DEMODULATOR FOR USE IN A COMMUNICATION DEVICE

BACKGROUND OF THE INVENTION

The present invention is related to radio frequency (RF) communication technology, and more particularly to a digital demodulator for use in a frequency modulation (FM) receiver.

In communication devices, such as RF receiver or transceiver devices, modulated RF signals are received and demodulated in order to extract the information carried by the RF signal. FM is one type of modulation widely used in cellular and paging systems. The FM signal is demodulated by a demodulator in the receiver device.

A conventional analog demodulator is most commonly used in FM receivers. An analog demodulator includes a post detection filter to eliminate unwanted signal frequencies generated as a result of the demodulation process. It is desirable to eliminate the need for the post detection filter, particularly when the information to be recovered as a result of the demodulation is digital data. It is also desirable to realize a digital demodulator which operates at an optimally low clock frequency, thus maximizing system power efficiency.

An all digital demodulator is needed that eliminates all of the drawbacks associated with an analog demodulator and which can efficiently be implemented in an integrated circuit environment.

DETAILED DESCRIPTION OF THE DRAWINGS

Figure 1:
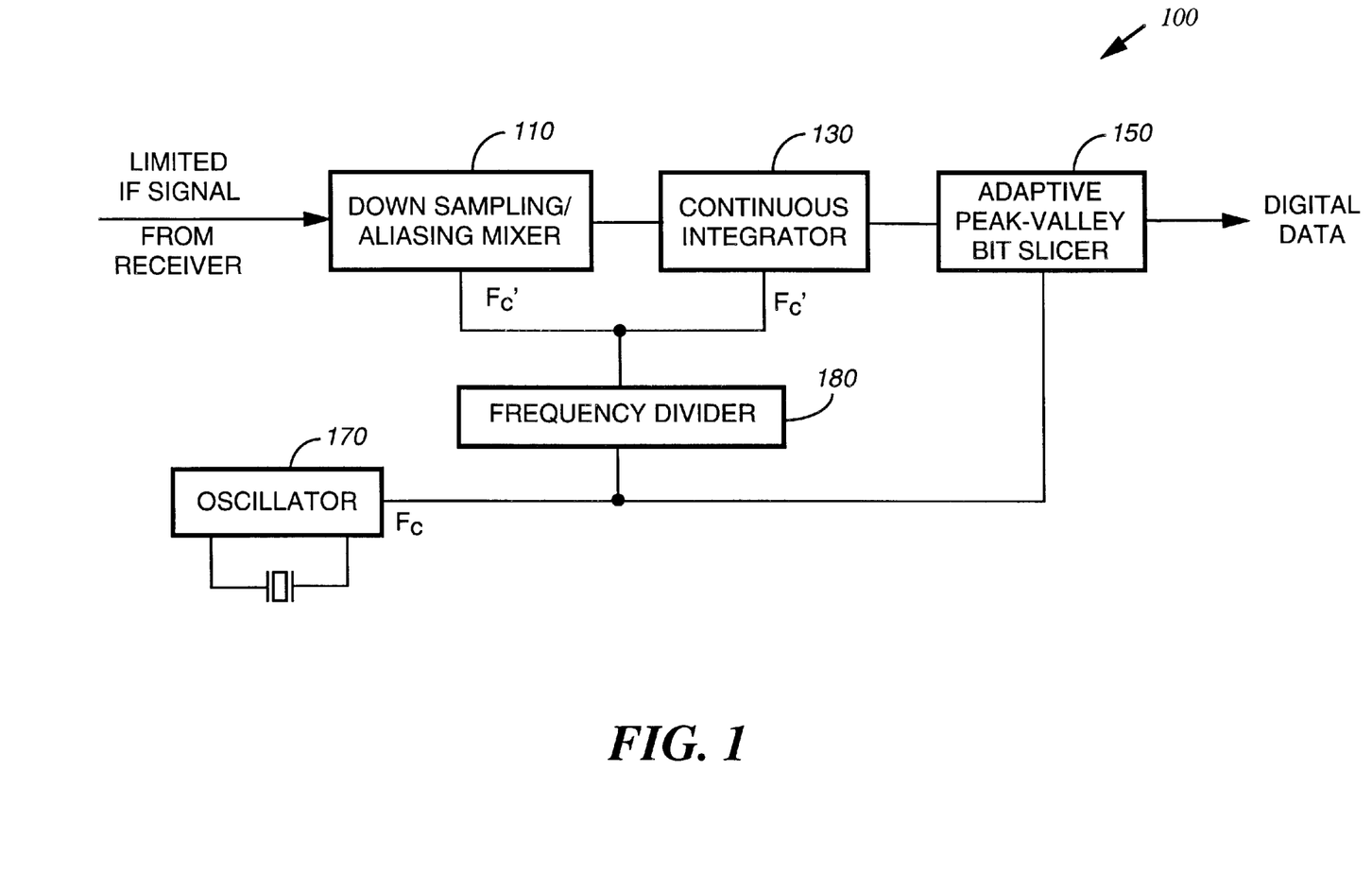
FIG. 1 is a block diagram of the digital demodulator according to the present invention.

Referring first to FIG. 1, the continuous integration digital demodulator (referred to as CED hereinafter) is shown at 100. The CID 100 comprises a down sampling/aliasing mixer (hereinafter referred to simply as "mixer") 110, a continuous integrator 130 and an adaptive peak-valley bit slicer 150. The CID 100 is an all digital demodulator preferably designed for integration onto an application specific integration circuit (ASIC). The CID 100 is clocked by an oscillator clock signal Fc generated by an oscillator 170. The clock signal Fc generated by the oscillator is suitable for clocking the adaptive peak-valley bit slicer 150 directly. For reasons which will become more readily apparent hereinafter, the sampling clock signal Fc' used to clock the mixer 110 and the continuous integrator 130 is a fraction of the frequency of the oscillator clock signal Fc. A frequency divider 180 is provided to generate the sampling clock signal Fc' from the oscillator clock signal Fc.

The CID 100 described hereinafter is designed for demodulating FM signals at variable baseband data speeds, such as 1600 symbols per second (sps) and 3200 sps. For example, the signal that is received and prepared for demodulation by the CID 100 may be a signal modulated in accordance with Motorola's FLEX™ paging protocol. However, it should be understood that the principals of the present invention can be applied to other modulation schemes, data rates or speeds and signal protocol schemes. The input to the CID 100 is a limited (bandwidth-limited) intermediate frequency (IF) signal, which is a squared-off representation of a narrow band filtered IF signal generated by a super-heterodyne receiver commonly used in paging receivers. The output of the CID 100 is digital information or data. Depending on how the digital data is interpreted by a device connected to the output of the CID 100, the digital data is either one bit data ("0" or "1") corresponding to one of 2 frequency levels, or two bit (MSB, LSB) symbols each corresponding to one of 4 frequency levels.

Figure 2:
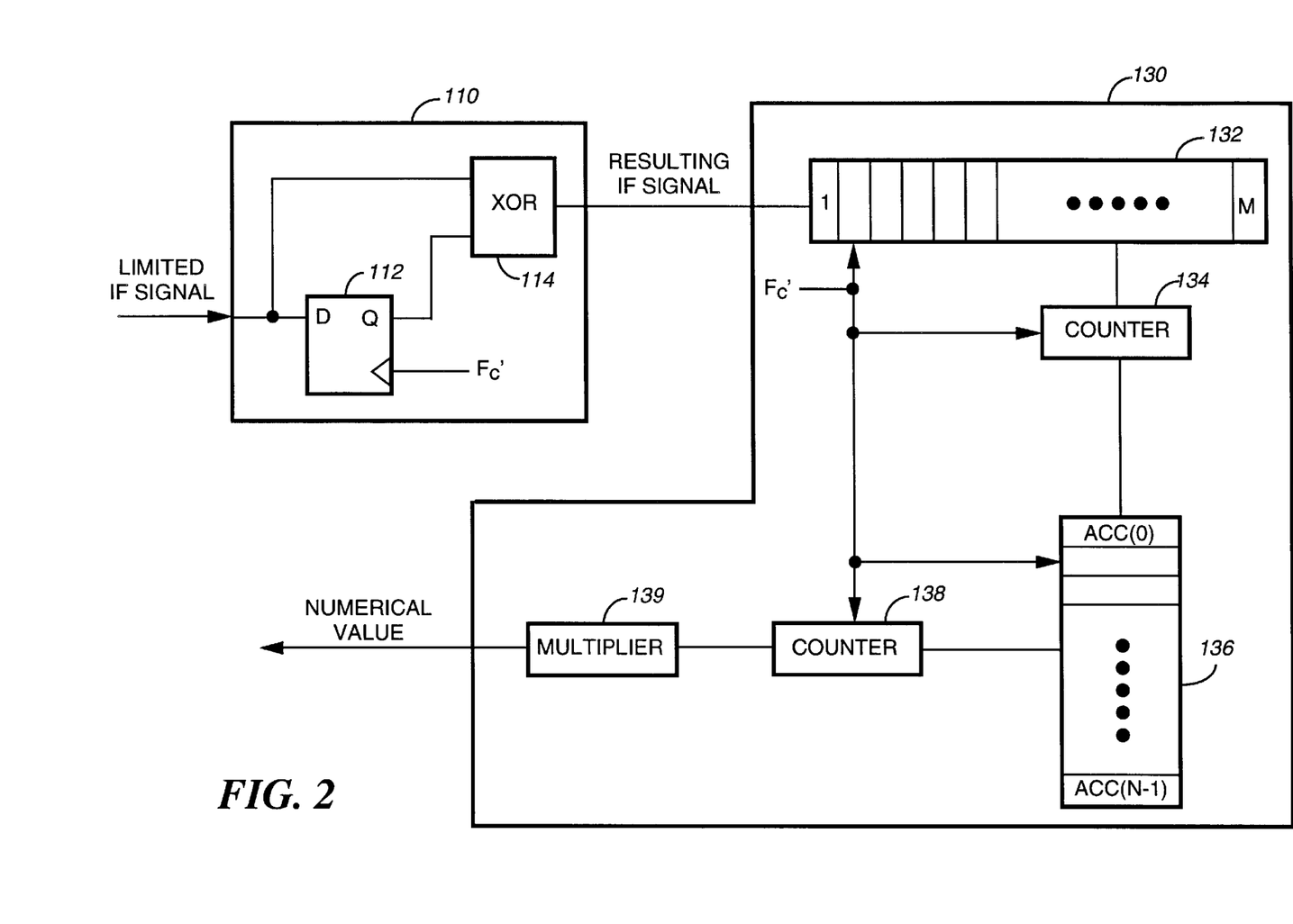
FIG. 2 is a schematic diagram showing the mixer and continuous integrator of the digital demodulator according to the present invention.

Turning now to FIG. 2, the mixer 110 and the continuous integrator 130 are shown in greater detail. The mixer comprises a D-type flip-flop 112 having a data input D, a data output Q and a clock input which receives the sampling clock signal Fc', and an exclusive-OR (XOR) gate 114 having two inputs, one of which is connected to the data output Q of the flip-flop 112 and the other which is connected to receive the limited IF signal. The limited IF signal is also connected to the data input D of the flip-flop 112. The sampling clock signal Fc' is at a frequency such that the mixer undersamples the limited IF signal. That is, the frequency of the sampling clock signal Fc' is less than the Nyquist rate (two times the highest frequency) of the limited IF signal. The exclusive-OR gate 114 compares a current sample of the limited IF signal with a prior sample (with respect to the frequency of the sampling clock signal Fc') and if there is a difference in the levels between the two samples, it produces a pulse. The output of the mixer is a resulting IF signal consisting of a train of pulses.

The mixer operates on the principle of aliasing due to under-sampling. This characteristic, together with the very high Q filters in the super-heterodyne receiver, results in filtering out all but the IF spectrum of interest. The frequency divider 180 is controlled to divide the clock signal Fc by a divider factor depending on the expected baud rate. As an example, the limited IF signal supplied to the mixer 110 is a 455 kHz signal or 140 kHz signal, at a baseband signal baud rate of 3200 sps or 1600 sps. The oscillator clock signal is 160 kHz. The frequency divider 180 divides the oscillator clock signal Fc by 1 to generate the sampling clock signal Fc' at 160 kHz for sampling an IF signal at an expected baud rate of 3200 sps. To sample an IF signal to recover digital data at 1600 sps, the frequency divider 180 divides the oscillator clock signal Fc by 2 to generate the sampling clock signal at 80 kHz. The 160 kHz and 80 kHz frequencies of the sampling clock signal Fc' allow the mixer to operate on a 455 kHz IF signal or a 140 kHz IF signal without any modification because the mixer downsamples the input limited IF signal to a resulting IF signal which is substantially equal in frequency for both limited IF signals. More specifically, when a 455 kHz IF signal at 3200 sps is sampled at 160 kHz, a resulting IF is produced at −25 kHz, or an inverted 25 kHz. At 1600 sps, a 455 kHz IF signal sampled at 80 kHz produces a resulting IF signal also at −25 kHz or an inverted 25 kHz. Similarly, when a 140 kHz IF signal at 3200 sps is sampled at 160 kHz, a resulting IF signal is produced at −20 kHz, or an inverted 20 kHz. At 1600 sps, the 140 kHz IF signal is sampled at 80 kHz to produce a resulting IF signal also at −20 kHz, or an inverted 20 kHz. Both the 80 kHz and 160 kHz sampling rates are less than the Nyquist rate of the limited IF signal, yet greater than the Nyquist rate of the bandwidth to which the limited IF is limited. This enables further processing of the resulting IF signal aliased to baseband in order to produce the resulting symbol data. In addition, the 160 kHz oscillator clock signal is an optimally low clock frequency for the limited IF signals described above, which contributes to maximizing the power efficiency of the CID 100, and of any communication device in which it is used.

The continuous integrator 130 comprises a shift register 132, a first counter 134, a circular buffer 136 comprising a plurality of N accumulators ACC(0) through ACC(N−1), a second counter 138 and a multiplier 139. The continuous integrator 130 takes a predetermined number of samples Z of the resulting IF signal for each symbol time period. The shift register 132 is a shift register with M bit positions, where M is an integer related to the predetermined number of samples taken of the resulting IF signal. The accumulators ACC(0) through ACC(N−1) are registers of sufficient width to accommodate the number of distinct levels used to represent the frequency of the IF signal. For example, the accumulators are 8 bit registers, which enables the representation of 255 levels. The number N of accumulators in the circular buffer 136 is also related the number of samples taken per symbol. That is, the predetermined number of samples Z taken for each symbol time period is equal to M+N. In the example described hereinafter, Z equals 50, M is equal to 40 and the number of accumulators N is equal to 10. The first counter 134 sums a weighted value for each bit position of the shift register 132, depending on the relative bit position and the value in that bit position. The first counter 134 generates a count value for all of the bit positions at each sample and the count value is stored in the first accumulator ACC(0). Count values are stored in the circular buffer 136 such that the current count value is stored in the first accumulator ACC(0) and count values for prior samples are stored in locations ACC(1) through ACC(N−1), where ACC(N−1) holds the count value for the "oldest" of the most recent 10 samples. The second counter 138 sums the count values in all of the accumulators of the circular buffer 136 coincident with each sample in order to produce a preliminary numerical value which is preliminary indicative of a modulation frequency of the baseband signal, integrated over one symbol time.

The weighted counting process performed by the counter will be described in more detail. The first counter 134 assigns weights to the presence of a transition in a bit position of the shift register 132 based on the location of the transition. The presence of a "1" in a bit position corresponds to a transition. The weight assigned is based on empirical data. Transitions which occur in the center half the symbol integration time period are given a greater weight than transitions which occur at the beginning or end of the integration time. This forms a flat top weighting function. In the example where M=40 and N=10, a weighted value of "three" is given to transitions occurring in the thirty two center bit positions of the shift register 132; a weighted value of "two" is given to transitions occurring in the second two and second to last two bit positions; and a weighted value of "one" is given to transitions occurring in the first two and last two bit positions. Each time a sample is loaded into the shift register 132, the first counter 134 sums the weighted value of all the locations of the shift register, based on the weighted function described above to generate a count value. This count value is then loaded into the circular buffer 136. The second counter 138 adds the count values of the accumulators in the circular buffer 136 at each sample. The preliminary numerical value output by the second counter is a multiple bit binary representation of a decimal number.

The process of matching the frequency of the sampling clock signal to the symbol rate (160 kHz for 3200 sps and 80 kHz for 1600 sps) assures that the mixer 110 and continuous integrator 130 process the input signal consistently across symbol speeds. This assists in providing a substantially constant input to the peak-valley bit slicer 150.

Furthermore, because the integration time is halved by switching from 1600 sps to 3200 sps, the numerical value produced by the summation of the accumulators ACC(0) through ACC(N−1) is also halved. To generate the numerical value used by the adaptive peak-valley bit slicer, the multiplier 139 multiplies the preliminary numerical value by a multiplier factor of 2 when processing a signal expected at 3200 sps. For 1600 sps, the multiplier factor is set to 1. In the example where the shift register 132 is 40 bits wide and there are ten accumulators in the circular buffer 136, the numerical value is represented by 11-bits. The control of the frequency divider 180 and multiplier 139 can be made by any device or circuit connected to the CID 100 that determines an expected baud rate of the digital data in the baseband signal. For example, a decoder (FIG. 7) which decodes a paging signal according to predefined rules, such as those defined by a FLEX™ paging signal format, controls the frequency divider 180 and multiplier 139. By using a constant weighting function and a multiplier to accommodate for changes in integration time, the weighted values counted by the counter 134 remain substantially constant between baud rates. Therefore, the peak and valley thresholds maintain reduced variation between baud rate changes, as will become more apparent hereinafter. The numerical value is a number which represents a modulation frequency of the basedband signal.

As an example of the operation of the continuous integrator, a limited IF signal at 140 kHz produces a numerical value at the output of the continuous integrator 130 of approximately 270 (base 10), and an IF signal at 455 kHz produces a numerical value of approximately 337 (base 10). An FM modulated signal having 3200 Hz between modulation levels results in a difference in the numerical value output by the continuous integrator 130 of approximately 42 (base 10). As a further example, the difference between the peak and valley modulation values of a signal modulated in accordance with the FLEX™ paging protocol is 130 (base 10).

Figure 3:
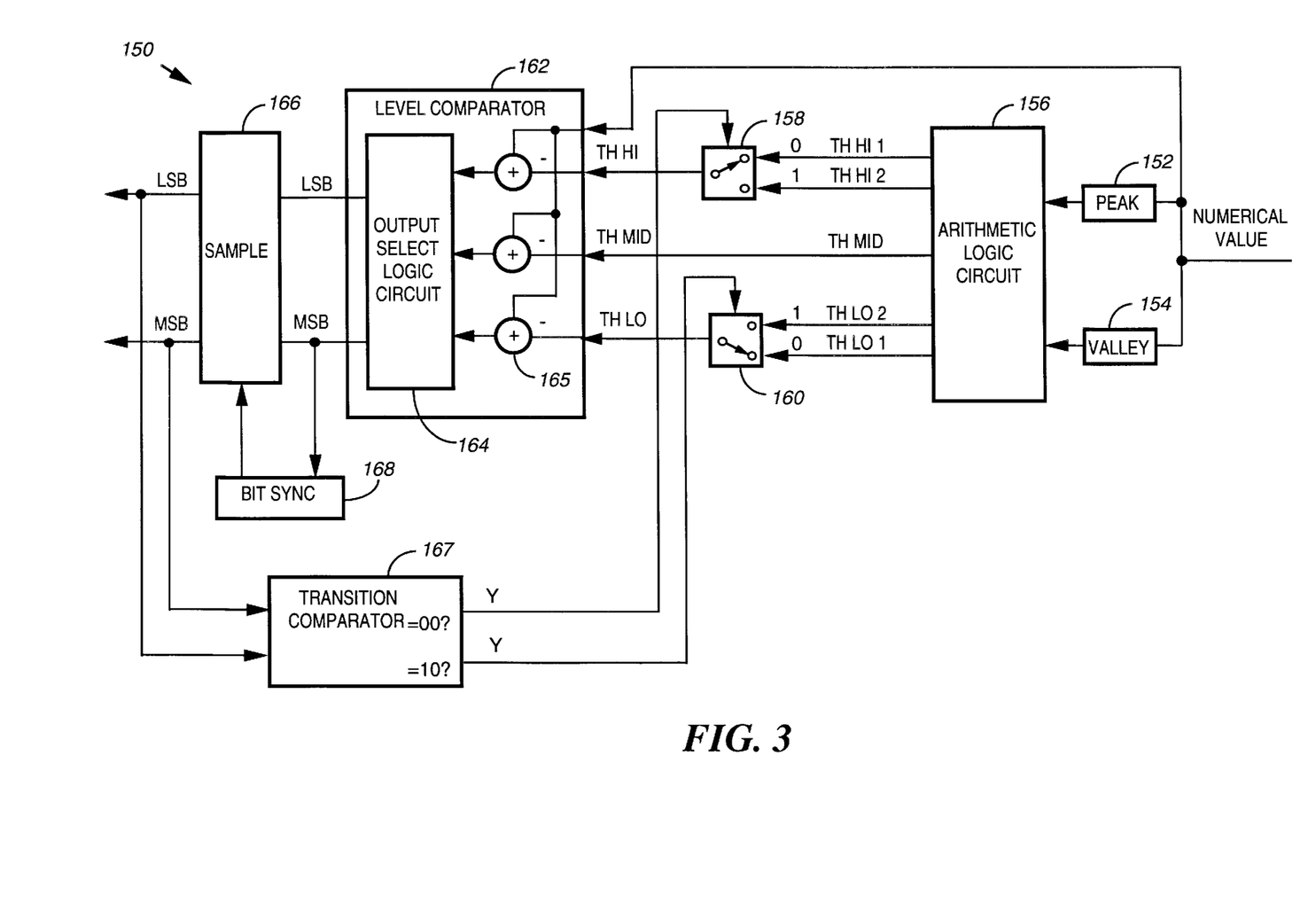
FIG. 3 is a block diagram of the adaptive peak-valley bit slicer of the digital demodulator of the present invention.

Referring now to FIG. 3, the adaptive peak-valley bit slicer 150 will be described in greater detail. The adaptive peak-valley bit slicer 150 comprises a peak detector 152 and a valley detector 154 which compare the numerical value with peak and valley thresholds, respectively. The peak and valley detectors 152 and 154 are connected to an arithmetic logic circuit 156. The arithmetic logic circuit 156 in turn generates five output signals TH HI1 TH HI2, TH MID, TH LO2 and TH LO1 and is connected to the first and second selector switches 158 and 160. The output signals TH HI1 and TH HI2 are connected to the first selector switch 158 and the output signals TH LO1 and TH LO2 are connected to the second selector switch 160. The selector switches 158 and 160 are in turn connected to the level comparator 162 and the TH MID output signal from the arithmetic logic unit 156 is also connected to the level comparator 162. The level comparator 162 comprises an output select logic circuit 164 that receives as input the numerical value, TH MID and TH HI (either TH HI1 or TH HI2) and TH LO (either TH LO1 or TH LO2). The level comparator 162 generates LSB and MSB values which are connected to the sample circuit 166. The sample circuit 166 is also connected to the bit sync circuit 168. The comparator 167 is connected to the output of the sample circuit 166 and also to the selector switches 158 and 160. The comparator 167 compares transitions from one LSB-MSB pair to the next and detects whether a transition has occurred from one of the "outer" levels. It is therefore hereinafter referred to as a transition comparator 167.

The adaptive peak-valley bit slicer 150 operates as follows. The numerical value output by the continuous integrator 130 is received as input and is processed by the adaptive peak-valley bit slicer on a sample-by-sample basis of received numerical values. The peak and valley detectors 152 and 154 supply updated peak (P) and valley (V) values on a sample-by-sample basis. Initially, the first numerical value received is stored as a current peak value and a current valley value in the peak and valley detectors 152 and 154. The next numerical value is then compared with the current peak value in the peak detector 152 and if it is greater than the current peak value, the peak value is incremented by a predetermined amount. If it is less than the current peak value, the peak value is not affected. Similarly, the valley detector 154 compares the next numerical value with its current valley value, and if it is less than the current valley value, it decrements the valley value by a predetermined amount. Ultimately, the peak and valley detectors 152 and 154 supply updated peak and valley values for the input signal based on the changing nature of the samples of the numerical value. The peak and valley detectors 152 and 154 are well known in the art. Each circuit of the adaptive peak-valley bit slicer 150 is clocked by the oscillator clock signal Fc.

The arithmetic logic circuit 156 receives the peak (P) and valley (V) values on a sample by sample basis and generates a plurality of thresholds: TH HI1, TH HI2, TH MID, TH LO2 and TH LO1. These thresholds are generated using the current peak (P) and current valley (V) values according to the equations:

$TH\ HI1 = (5P+V)/6$ $TH\ HI2 = (3P+V)/4$ $TH\ MID = (P+V)/2$ $TH\ LO2 = (P+3V)/4$ $TH\ LO1 = (P+5V)/6$

First and second peak thresholds TH HI1 and TH HI2 are the candidate peak thresholds and first and second valley thresholds TH LO1 and TH LO2 are the candidate valley thresholds. TH MID is the mid threshold. As seen in the equations above, the first peak threshold TH HI1 is greater in magnitude than the second peak threshold TH HI2. Similarly, the second valley threshold TH LO2 is less in magnitude than the first valley threshold TH LO1. These thresholds are supplied as output to the selector switches 158 and 160 and to the level comparator 162 as shown. Selector switch 158 supplies either TH HI1 or TH HI2 to the level comparator 162 and selector switch 160 supplies either TH LO1 or TH LO2 to the level comparator 162. Which candidate threshold is selected depends on the output of the transition comparator 167. If the MSB and LSB values for the prior sample were "00", then the transition comparator 167 controls the selector switch 158 to select TH HI2 for connection to the level comparator 162 to be used as the peak threshold TH HI in the current level comparison. Otherwise, TH HI1 is selected for use by the level comparator 162. Similarly, if the MSB and LSB values for the prior sample were "10", then the transition comparator 167 controls the selector switch 160 to select TH LO2 as the valley threshold TH LO in the current level comparison, and otherwise TH LO1 is selected in the current level comparison.

Figure 4:
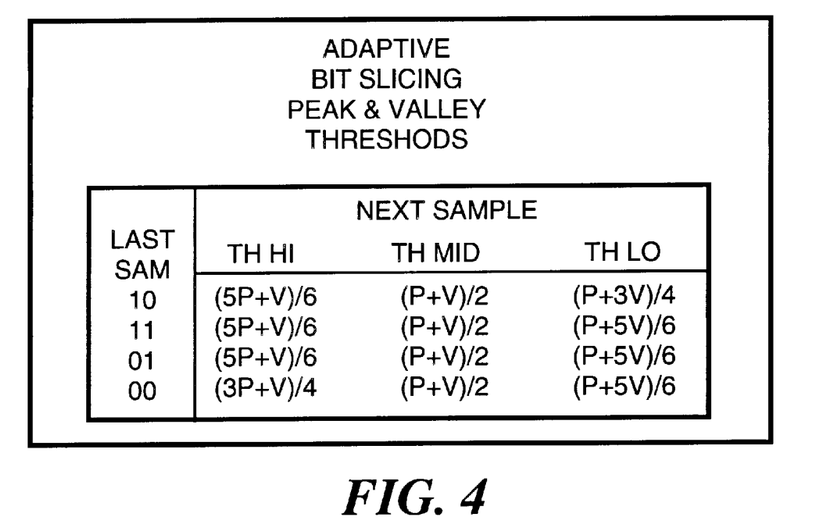
FIG. 4 is a table listing calculations for the peak, valley and mid threshold values in the adaptive peak-valley bit slicer.
Figure 5:
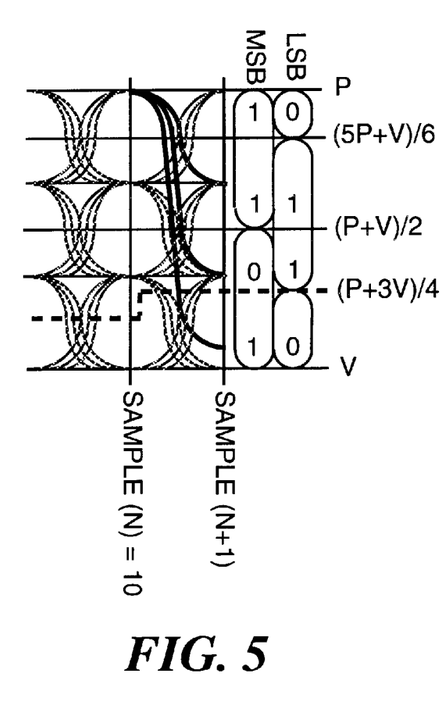
FIGS. 5 and 6 are graphical diagrams illustrating the generation of adaptive peak and valley thresholds in the adaptive peak-valley bit slicer.
Figure 6:
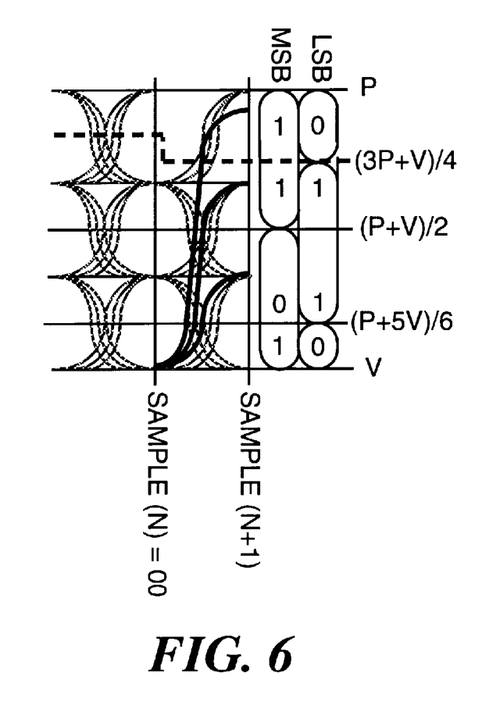

The table in FIG. 4 and the diagrams in FIGS. 5 and 6 summarize the effect that the operation of the transition comparator 167 and the selector switches 158 and 160 have on the peak and valley thresholds in the cases where the prior numerical value falls into an "outer" one of the 4 levels. When the MSB and LSB values correspond to the "outer" levels of the 4-level signal, then the peak and valley thresholds are adaptive or adjusted for the current level comparison. Modifying the peak and valley thresholds compensates for the reduced slew rate for these peak to valley or valley to peak transitions, and reduces the bit error rate in the LSB.

The level comparator 162 receives the numerical value as input and compares it with the peak threshold TH HI, the mid threshold TH MID and the valley threshold TH LO. Specifically, the numerical value is passed through a series of adders 165 each of which subtract the thresholds TH HI, TH MID and TH LO from the numerical value and supply the result to an output select logic circuit 164. The output select logic circuit 164 determines where the numerical value falls with respect to the TH HI, TH MID and TH LO thresholds in order to determine the corresponding bit pattern assigned to that level. If it is greater than TH HI, the LSB is "1" and the LSB is "0". If the numerical value is between TH HI and TH MID, the LSB and MSB are "1". If the numerical value is between TH MID and TH LO, the LSB is "1" and the MSB is "0", and if the numerical value is less than TH LO, the LSB and MSB are "0". The LSB and MSB values are supplied to the sample circuit 166. The sample circuit 166 stores one prior sample of LSB and MSB values. The MSB value is also sampled by the bit sync circuit 168. The bit sync circuit 168, by defining the symbol center point, registers the need to re-initialize the comparison process on a symbol by symbol basis. The MSB output by the level comparator 162 may also be coupled to a baud detector (not shown) to provide sufficient phase noise for use in conventional baud detection schemes.

To summarize the operation of the CID 100, the limited IF signal is mixed down by the mixer 110 to a resulting IF signal residing in a frequency range which is less than half the sampling frequency of the system. The continuous integrator 130 generates a numerical value representing a modulation frequency of the baseband signal integrated over a symbol time period. The adaptive peak-valley bit slicer determines the modulation level of the numerical value with respect to thresholds and generates as output the digital data or binary information represented by each modulation level. In the example of 4-level FM, the adaptive peak-valley bit slicer 150 generates MSB and LSB values, either 00, 01, 10 or 11. The demodulated data recovered by the CID 100 is 2 or 4-level FM, depending upon how the data is interpreted and at what rate it is interpreted. If the output of the CID 100 is interpreted so as to ignore the LSB, then the data is interpreted as 2-level data.

The integration approach taken in accordance with the present invention has several advantages. First, it eliminates the need for a post detection filter. The need to shift the cut off frequency of the post detection filter between baud rates is therefore unnecessary and the optimal cut-off frequency of the post detection filter in a simulcast environment is not a design concern. Second, the demodulator according to the present invention is entirely a digital device. As a result, the "S" curve of the demodulated signal is extremely linear over a broad range of IF signals and also is not subject to voltage, temperature and hysteresis effects of conventional demodulators. Also, because the output of the continuous integrator 130 is digital, there is no need for an analog-to-digital (A/D) converter as is the case in a conventional bit slicer.

Further, the continuous integration approach employed by the present invention has the advantage over the conventional integrate-and-dump post detection filter architecture because synchronization is not required for demodulation. Consequently, it is not necessary to determine boundaries of the symbol in order to perform the integration. The continuous integrator of the present invention allows for phase noise in the MSB, which is useful in baud detection.

The continuous integration digital demodulator is useful in other modulation applications, including zero-IF (ZIF) I and Q channels. It also can supply valuable information for automatic frequency control (AFC) algorithms. Further, the frequency/time accuracy of the continuous integration digital demodulator can form the basis of an improved bit slicer using a Hamming distance from theoretical symbol occurrences based on both frequency and time.

Figure 7:
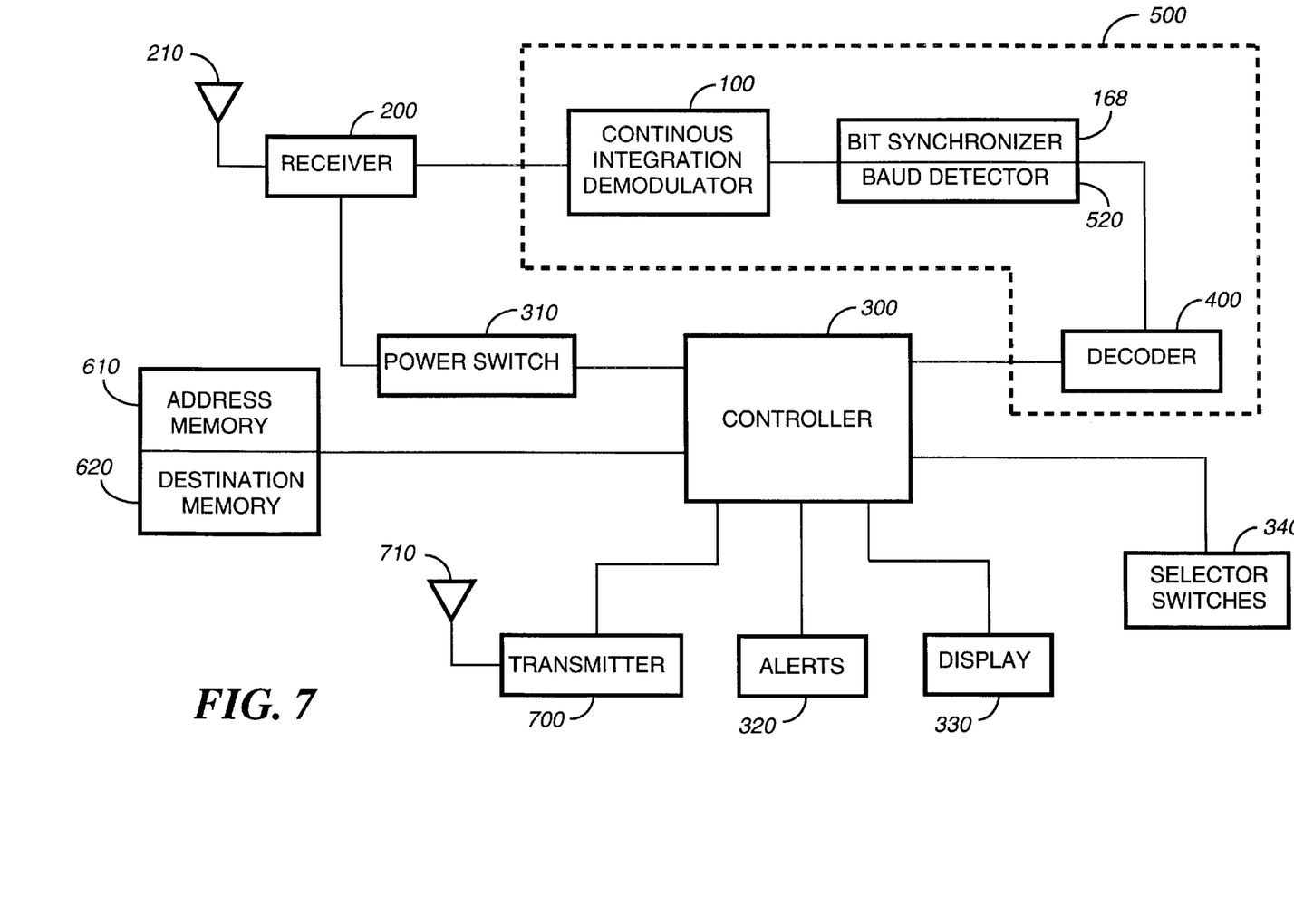
FIG. 7 is a block diagram of a selective call receiver employing the digital demodulator according to the present invention.

FIG. 7 shows an example of a communication device that employs the CID 100 according to the present invention. This diagram shows a communication device such as a selective call receiver device (pager) 800. A selective call receiver comprises, of most significance to the present invention, a receiver 200, such as a super-heterodyne receiver, a controller 300, and a decoder 400. An RF signal is detected by the antenna 210 and received by the receiver 200. The output of the receiver 200 is bandwidth limited (a limited IF signal) and connected to the CID 100. The CID 100 generates the digital data derived from a FM signal. The digital data is usually passed through the bit synchronizer 168 and a baud detector 520 to verify that the signal received is at an expected baud rate. The decoder 400 receives as input the digital data and decodes the received digital data in accordance with a predetermined protocol. Examples of such protocols are the FLEX™ and ReFLEX™ paging protocols developed by Motorola, Inc.

The controller 300 is the focal point for control of the selective call receiver 800. It receives the decoded information generated by the decoder 400 and generates various functions depending on the content of the decoded information.

The decoder 400 is connected to the CID 100 and adjusts the divider factor of the frequency divider 180 and the multiplier factor of the multiplier 139 depending on an expected baud rate. For example, when decoding a FLEX™ formatted paging signal, the initial portion of a frame called the preamble, which is a 2-level FM signal at 1600 sps, is demodulated by the CID 100 and the preamble data indicates the baud rate of the remaining data in the frame: 1600 sps, 3200 sps, 2-level, 4-level, for example. The decoder 400 determines the baud rate requirements based on the FLEX™ preamble and reconfigures the sampling rate of the CID 100 to demodulate data in the frame on a real time basis. This also dictates how the decoder 400 interprets the demodulated data (2-level,4-level, 1600 sps or 3200 sps). The divider factor of the frequency divider 180 and multiplier factor multiplier 139 may be configured to default values in order to demodulate 1600 sps. It is also possible for the controller 300 to control the frequency divider 180 and multiplier 139. Messages contained in the decoded information are displayed by the controller 300 on a display 330. User control of the selective call receiver 800 is through the selector switches 340. Audible and/or visual alerts are issued by the controller on the alerts 320. In addition, the controller 300 may shut down the receiver 200 (as well as other circuitry) through the power switch 310 in accordance with the many battery saving methodologies. The address information for the selective call receiver 800 is stored in an address memory and messages (text, graphics, voice) are stored in a destination memory 620. The selective call receiver 800 optionally has two way communication capabilities through a transmitter 700 and transmission antenna 710.

In many applications, it is desirable to integrate many circuits onto a single integrated circuit, such as an ASIC. The CID 100 is preferably integrated onto a single digital ASIC 500 (shown in phantom in FIG. 7) that includes the decoder 400 as well as the bit synchronizer 168 and baud detector 520. For example, the CID 100 has been implemented with approximately 2,500 gates, thus occupying minimal space in an integrated circuit.

The above description is intended by way of example only and is not intended to limit the present invention in any way except as set forth in the following claims.

What is claimed is:

1. A digital demodulator comprising:

an oscillator generating as output an oscillator clock signal;

a frequency divider coupled to the oscillator clock signal, wherein the oscillator generates the oscillator clock signal at a first frequency and the frequency divider divides the oscillator clock signal by a divider factor to generate a sampling clock signal at a second;

a mixer coupled to the sampling clock signal, the mixer suitable for receiving as input a limited IF signal derived from a received radio frequency (RF) signal and sampling the limited IF signal in accordance with the sampling clock signal to generate as output a resulting IF signal;

a continuous integrator connected to the mixer and coupled to the sampling clock signal, the continuous integrator integrating the resulting IF signal over a predetermined number of samples of the limited IF signal to generate a numerical value representative of a modulation frequency of a baseband signal, the continuous integrator being driven by the sampling clock signal and generating as output a numerical value for each sample of the limited IF signal; and a peak-valley bit slicer connected to the continuous integrator and to the oscillator, the peak-valley bit slicer comparing each numerical value with thresholds to determine corresponding digital data of the baseband signal.

2. The digital demodulator of claim 1, wherein the mixer samples the limited IF signal at a sampling rate which is less than a Nyquist sampling rate of a frequency band to which the limited IF signal is band-limited.

3. The digital demodulator of claim 1, wherein the mixer comprises:

a flip-flop having a data input connected to receive the limited IF signal, a data output, and a clock input coupled to the frequency divider for receiving the sampling clock signal;

an exclusive-OR gate having first and second inputs and an output, the first input connected to receive the limited IF signal and the second input connected to the data output of the flip-flop, the exclusive-OR gate generating a pulse on its output in response to detecting a difference between a level of the limited IF signal at successive cycles of the sampling clock signal.

4. The digital demodulator of claim 1, wherein the frequency divider divides the oscillator clock signal by a divider factor depending on an expected baud rate of the digital data in the baseband signal.

5. The digital demodulator of claim 1, wherein the continuous integrator comprises:
a shift register having a plurality of bit positions;
a first counter connected to the shift register for counting weighted values for each position of the shift register to generate a count value for each sample, the weighted values being assigned depending on a relative position in the shift register and a bit value at each position;
a circular buffer comprising a plurality of accumulators each storing a count value for prior symbol samples; and
a second counter connected to the accumulators for adding count values stored in all of the accumulators and generating a preliminary numerical value.

6. The digital demodulator of claim 5, wherein the continuous integrator further comprises:
a multiplier connected to the second counter for multiplying the preliminary numerical value by a multiplier factor depending on an expected baud rate of the digital data in the baseband signal to generate the numerical value.

7. The digital demodulator of claim 5, wherein the first counter assigns a greater weighted value for transitions occurring at a center of a symbol integration time period than for transitions occurring at a beginning or an end of the symbol integration time period.

8. The digital demodulator of claim 5, wherein the predetermined number of samples is 50, a number of bits in the shift register is 40 and a number of accumulators in the circular buffer is 10, and wherein the first counter assigns a weighted value of "one" to transitions occurring in first two and last two bit positions of the shift register, a weighted value of "two" to transitions occurring in second two and second to last two bit positions, and a weighted value of "three" to transitions occurring in any of thirty two bit positions in a center of the shift register.

9. The digital demodulator of claim 1, wherein the peak-valley bit slicer compares the numerical value output by the continuous integrator with a peak threshold, a valley threshold and a mid threshold and generates digital data for each sample.

10. The digital demodulator of claim 9, wherein the peak-valley bit slicer adjusts the peak and valley thresholds for use in determining a level of a current sample of the numerical value based on the digital data determined for a prior sample.

11. The digital demodulator of claim 1, wherein the peak-valley bit slicer adjusts the thresholds for use in determining the digital data for a current sample of the numerical value based on digital data determined for a prior sample of the numerical value.

12. The digital demodulator of claim 11, wherein the peak-valley bit slicer adjusts the peak and valley thresholds when the digital data determined for a prior sample corresponds to outer levels of a 4-level FM signal.

13. The digital demodulator of claim 1, wherein the peak-valley bit slicer comprises:
a peak detector receiving as input the numerical value generated by the continuous integrator and comparing a current sample of the numerical value with a prior sample thereof to provide as output a current peak value;
a valley detector receiving as input the numerical value generated by the continuous integrator and comparing a current sample of the numerical value with a prior sample thereof to provide as output a current valley value;
an arithmetic logic circuit connected to the peak detector and to the valley detector to receive as input the current peak value and the current valley value, the arithmetic logic circuit generating as output first and second peak thresholds, a mid threshold and first and second valley thresholds based on the current peak value and the current valley value;
a first selector switch connected to the arithmetic logic circuit and receiving the first and second peak thresholds, the first selector switch supplying as output either the first peak threshold or the second peak threshold;
a second selector switch connected to the arithmetic logic circuit and receiving the first and second valley thresholds, the second selector switch supplying as output either the first valley threshold or the second valley threshold;
a level comparator connected to the arithmetic logic circuit and to the output of the first and second selector switches, the level comparator comparing the numerical value with one of the first and second peak thresholds, the mid threshold and one of the first and second valley thresholds, to generate as output least-significant-bit (LSB) and most-significant-bit (MSB) values depending on a level of the numerical value; and
a transition comparator receiving as input LSB and MSB values for a prior sample of the numerical value and controlling which of the first and second peak thresholds the first selector switch supplies as output and which of the first and second valley thresholds the second selector switch supplies as output.

14. The digital demodulator of claim 13, wherein the arithmetic logic circuit generates the first and second peak thresholds such that the first peak threshold is greater than the second peak threshold, and generates the first and second valley thresholds such that the second valley threshold is less than the first valley threshold.

15. The digital demodulator of claim 14, wherein the transition comparator controls the first selector switch to supply as output the second peak threshold when the LSB and MSB values for a prior sample are both "0" and otherwise controls the first selector switch to supply as output the first peak threshold, and controls the second selector switch to supply as output the second valley threshold when the LSB and MSB values for a prior sample are "1" and "0", respectively, and otherwise controls the second selector switch to supply as output the first valley threshold.

16. An RF communication device comprising the digital demodulator of claim 1.

17. In combination on a single integrated circuit, the digital demodulator of claim 1 and a decoder coupled to the digital demodulator to receive and decode the digital data output by the digital demodulator.

18. The combination of claim 17, wherein the decoder controls a frequency of a sampling clock signal for the mixer and continuous integrator based upon an expected baud rate of the digital data in the baseband signal.

19. The combination of claim 17, wherein the continuous integrator comprises:

a shift register having a plurality of bit positions;

a first counter connected to the shift register for counting weighted values for each position of the shift register to generate a count value for each sample, the weighted values being assigned depending on a relative position in the shift register and a bit value at each position;

a circular buffer comprising a plurality of accumulators each storing a count value for prior symbol samples; and a second counter connected to the accumulators for adding count values stored in all of the accumulators and generating a preliminary numerical value; and a multiplier connected to the second counter for multiplying the preliminary numerical value by a multiplier factor to generate the numerical value representing the modulation frequency of the baseband signal; and wherein the decoder controls the divider factor of the frequency divider and the multiplier factor of the multiplier according to an expected baud rate of the digital data in the baseband signal.

20. A selective call receiver comprising the digital demodulator of claim 1, wherein the selective call receiver comprises:

a receiver for receiving an RF signal and generating as output the limited IF signal;

a decoder coupled to the peak-valley bit slicer to receive and decode the digital information; and a controller coupled to the decoder and to the receiver for processing the digital information decoded by the decoder.

21. A digital demodulator for use in a receiver comprising:

an oscillator generating as output an oscillator clock signal;

a frequency divider coupled to the oscillator and receiving as input the oscillator clock signal and frequency dividing the oscillator clock signal by a divider factor to generate as output a sampling clock signal;

a mixer coupled to the sampling clock signal, the mixer suitable for receiving as input a limited IF signal derived from a received radio frequency (RF) signal and sampling the limited IF signal in accordance with the sampling clock signal derived from the oscillator clock signal to generate as output a resulting IF signal;

a continuous integrator connected to the mixer and coupled to the sampling clock signal, the continuous integrator integrating the resulting IF signal over a predetermined number of samples of the limited IF signal to generate a numerical value representative of a modulation frequency of a baseband signal, the continuous integrator being driven by the sampling clock signal and generating as output a numerical value for each sample of the limited IF signal;

an adaptive peak-valley bit slicer connected to the continuous integrator and to the sampling clock signal, the adaptive peak-valley bit slicer comparing each numerical value with a peak threshold, a valley threshold and a mid threshold and generating digital data comprising most-significant-bit (MSB) and least-significant-bit (LSB) values for each sample, wherein the adaptive peak-valley bit slicer adjusts the peak and valley thresholds for use in determining a level of a current sample of the numerical value based on the LSB and MSB values determined for a prior sample.

22. The digital demodulator of claim 21, wherein the adaptive peak-valley bit slicer adjusts the peak and valley thresholds when the LSB and MSB values determined for a prior sample correspond to outer levels of a 4-level FM signal.

23. The digital demodulator of claim 21, wherein the adaptive peak-valley bit slicer comprises:

a peak detector receiving as input the numerical value generated by the continuous integrator and comparing a current sample of the numerical value with a prior sample thereof to provide as output a current peak value;

a valley detector receiving as input the numerical value generated by the continuous integrator and comparing a current sample of the numerical value with a prior sample thereof to provide as output a current valley value;

an arithmetic logic circuit connected to the peak detector and to the valley detector to receive as input the current peak value and the current valley value, the arithmetic logic circuit generating as output first and second peak thresholds, a mid threshold and first and second valley thresholds based on the current peak value and the current valley value;

a first selector switch connected to the arithmetic logic circuit and receiving the first and second peak thresholds, the first selector switch supplying as output either the first peak threshold or the second peak threshold;

a second selector switch connected to the arithmetic logic circuit and receiving the first and second valley thresholds, the second selector switch supplying as output either the first valley threshold or the second valley threshold;

a level comparator connected to the arithmetic logic circuit and to the output of the first and second selector switches, the level comparator comparing the numerical value with one of the first and second peak thresholds, the mid threshold and one of the first and second valley thresholds, to generate as output least-significant-bit (LSB) and most-significant-bit (MSB) values depending on a level of the numerical value relative to the thresholds; and a transition comparator receiving as input LSB and MSB values for a prior sample of the numerical value and controlling which of the first and second peak thresholds the first selector switch supplies as output and which of the first and second valley thresholds the second selector switch supplies as output.

24. The digital demodulator of claim 23, wherein the arithmetic logic circuit generates the first and second peak thresholds such that the first peak threshold is greater than the second peak threshold, and generates the first and second valley thresholds such that the second valley threshold is less than the first valley threshold.

25. The digital demodulator of claim 24, wherein the transition comparator controls the first selector switch to supply as output the second peak threshold when the LSB and MSB values for a prior sample are both "0" and otherwise controls the first selector switch to supply as output the first peak threshold, and controls the second selector switch to supply as output the second valley threshold when the LSB and MSB values for a prior sample are "1" and "0", respectively, and otherwise controls the second selector switch to supply as output the first valley threshold.

26. In combination on a single integrated circuit, the digital demodulator of claim 21, and a decoder coupled to the digital demodulator to receive and decode the digital data output by the digital demodulator.

27. The combination of claim 26, wherein the decoder controls a frequency of the sampling clock signal for the mixer and continuous integrator based upon an expected baud rate of digital data in the baseband signal.

28. A selective call receiver comprising the digital demodulator of claim 21, wherein the selective call receiver comprises:

a receiver for receiving an RF signal and generating as output the limited IF signal;

a decoder coupled to the peak-valley bit slicer to receive and decode the digital information; and a controller coupled to the decoder and to the receiver for processing the digital information decoded by the decoder.

29. In combination, a digital demodulator and control means for controlling the digital demodulator, the digital demodulator comprising:

an oscillator generating as output an oscillator clock signal;

a frequency divider connected to the oscillator and receiving as input the oscillator clock signal and frequency dividing the oscillator clock signal by a divider factor to generate as output a sampling clock signal;

a mixer connected to the frequency divider, the mixer suitable for receiving as input a limited IF signal derived from a received radio frequency (RF) signal and sampling the limited IF signal in accordance with the sampling clock signal to generate as output a resulting IF signal;

a continuous integrator connected to the frequency divider and coupled to the oscillator, the continuous integrator integrating the resulting IF signal over a predetermined number of samples of the limited IF signal, the continuous integrator being driven by the sampling clock signal and generating a preliminary numerical value for each sample of the limited IF signal, the continuous integrator comprising a multiplier for multiplying the preliminary numerical value by a multiplier factor in order to generate a numerical value representative of a modulation frequency of a baseband signal; and a peak-valley bit slicer connected to the continuous integrator and to the oscillator, the peak-valley bit slicer comparing each numerical value with thresholds to determine corresponding digital data of the baseband signal;

wherein the control means controls the divider factor of the frequency divider and the multiplier factor of the multiplier depending upon an expected baud rate of the digital data in the baseband signal.

\* \* \* \* \*